United States Patent [19]
Gossett

[11] Patent Number: 5,699,079
[45] Date of Patent: Dec. 16, 1997

[54] RESTORATION FILTER FOR TRUNCATED PIXELS

[75] Inventor: Carroll Philip Gossett, Mountain View, Calif.

[73] Assignee: Silicon Graphics, Inc., Mountain View, Calif.

[21] Appl. No.: 561,584

[22] Filed: Nov. 21, 1995

[51] Int. Cl.$^6$ ........................................ G09G 5/04
[52] U.S. Cl. ..................... 345/155; 345/136; 345/153; 395/501; 382/254
[58] Field of Search ........................ 395/162–166, 395/501, 502, 503, 507, 515; 345/133, 136, 138, 139, 147, 185, 189, 153, 155; 348/671; 358/429, 443, 448, 455–460; 382/260–262, 274, 254, 258

[56] References Cited

U.S. PATENT DOCUMENTS

| | | | |
|---|---|---|---|
| 4,951,232 | 8/1990 | Hannah | 395/122 |
| 4,979,136 | 12/1990 | Weiman et al. | 382/169 |
| 5,038,297 | 8/1991 | Hannah | 395/164 |
| 5,081,450 | 1/1992 | Lucas et al. | 345/155 |
| 5,122,784 | 6/1992 | Canova | 345/155 |
| 5,374,963 | 12/1994 | Willis | 348/564 |
| 5,469,190 | 11/1995 | Masterson | 345/155 |

OTHER PUBLICATIONS

Foley, James D. et al., *Computer Graphics*, Second Edition, Addison–Wesley Publishing Company, Reading, Massachusetts, ©1990, pp. 568–573, 599–600.

*Primary Examiner*—Kee M. Tung
*Attorney, Agent, or Firm*—Sterne, Kessler, Goldstein & Fox pllc

[57] ABSTRACT

A system and method for restoring bits of pixels prior to display where the original bits of the pixels were truncated compares each pixel to its neighbors to determine the relative value of each pixel as compared to its neighbors. First, the truncated pixel is shifted. That is, the remaining bits of the pixel are shifted to the left and additional bits are added in the least significant bit positions. Next, the pixel is compared to its neighbors to determine their relative values. For each neighbor that is greater than the pixel in question, the truncated shifted pixel is incremented by one. Similarly, for each neighbor that is less than the pixel in question, the truncated shifted pixel is decremented by one. Once the pixel is evaluated relative to its neighboring pixels, determination of the restored pixel is complete. The restored pixel can then be displayed.

24 Claims, 2 Drawing Sheets

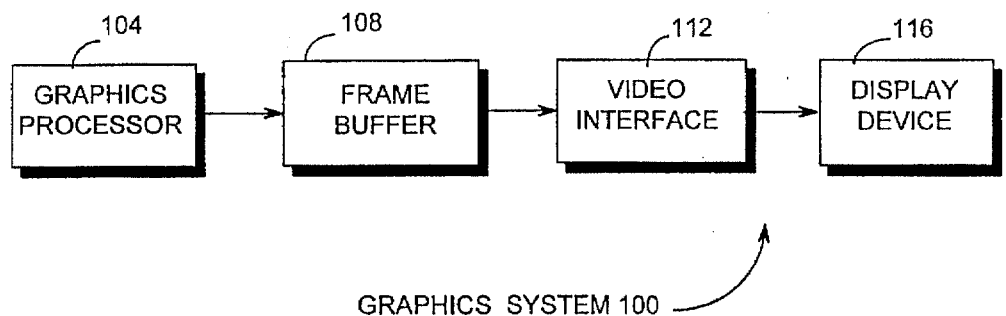
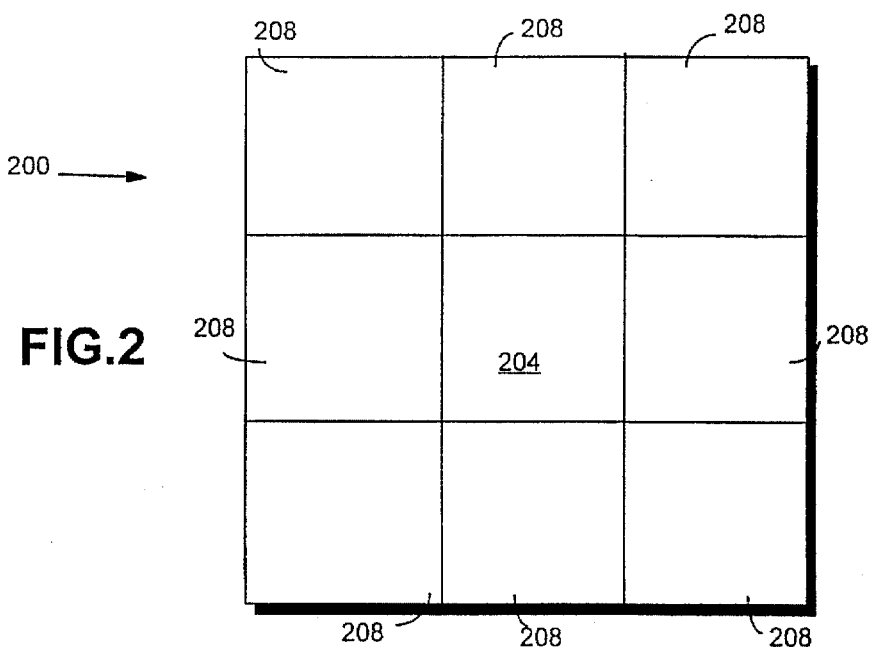
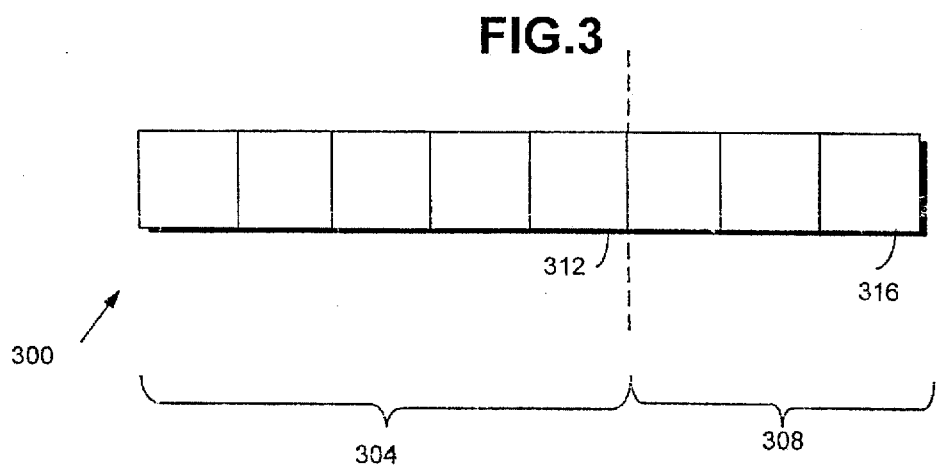

RESTORATION FILTER FOR TRUNCATED PIXELS

BACKGROUND OF THE INVENTION

1. Field of the Invention

This invention relates generally to computer graphics systems, and more specifically to a system and method for restoring bits of pixels prior to display where the original bits of the pixels were truncated.

2. Related Art

Computer graphics systems in which graphics processors are used to draw images on a display screen are enjoying widespread acceptance in many facets of the current electronics marketplace. This is true for high-end computer graphics workstations as well as mid-range and low-end consumer oriented products. In such systems the graphics processor draws, or renders, the image by generating attribute information for each pixel of the display. Each pixel of the display is represented by a plurality of bits. Depending on the display characteristics and the complexity of the graphics system, these bits can represent attributes of the pixel such as color (e.g., red, green and blue bits or a grey scale), transparency or opacity, depth, and other like attributes.

As is the case with numerous products for the commercial and non-commercial markets, there are numerous cost-benefit tradeoffs that must be performed when specifying a computer graphics system. One such cost-benefit tradeoff is that which exists between the cost of memory and the number of planes provided in the frame buffer (i.e., the number of bits dedicated to each pixel). Systems with more planes (i.e., more bits per pixel) can typically provide more realistic images than systems with fewer planes. This is true because the additional planes can be used to increase the color palette or to add additional features such as texture, depth and the like.

To minimize this component of the cost of the graphics system, it is desirable to use as few bits per pixel as possible. One way to decrease the number of bits per pixel used is to truncate the bits. That is, the pixels are generated with the full complement of bits, and the low-order bits are truncated prior to storage in the frame buffer. Thus, the image can be rendered with fewer bits per pixel and the size of the frame buffer can be decreased. As an example, consider a system that is specified as an 8-bit-per-pixel system, but for cost purposes, it is desirable to have a five bit system. In this case, the 3 least significant bits are truncated.

However, one disadvantage of truncation is that the use of too few bits can result in unacceptable artifacts such as quantization (sometimes known as "mach banding") and poor image quality. To compensate, dithering is sometimes used to disrupt the regularity of the artifacts, thereby softening the effects of reach banding. However, dithering is perceived by the eye as noise and can itself be objectionable, especially at low quantities of bits per pixel.

What is needed then, is a technique for allowing the size of the frame buffer to be reduced without having the unwanted side effects attributed to truncation and dithering.

BRIEF SUMMARY OF THE INVENTION

The present invention is directed toward a system and method for restoring bits of pixels prior to display where the original bits of the pixels were truncated. According to the invention, before a truncated pixel is displayed, the bits removed during truncation are restored. The restoration process is accomplished by comparing each pixel to its neighbors to determine the relative value of each pixel as compared to its neighbors. As a result of this comparison, a restoration value is determined for each pixel. This restoration value is added to the truncated pixel prior to display.

In one embodiment, the restoration process is executed for each pixel as follows. First, the pixel is shifted. That is, the remaining bits of the pixel are shifted to the left and additional bits are added in the least significant bit positions. These additional bits are referred to as the restoration offset of the pixel. Preferably, these additional bits are zeroes. The entire pixel comprising the shifted truncated portion and the restoration offset is referred to as the truncated shifted pixel, or the restored pixel.

Next, the pixel is compared to each neighbor to determine their relative values. For each neighbor that is greater than the pixel in question, the restoration offset is incremented by one. Similarly, for each neighbor that is less than the pixel in question, the restoration offset is decremented by one. In the preferred embodiment, overflow of the restoration offset resulting from the increment/decrement operations is carded over into the truncated and shifted portion of the pixel. In other words, in the preferred embodiment, it is actually the truncated shifted pixel which is incremented or decremented for each neighbor compared.

Once each neighbor is evaluated relative to the pixel in question, determination of the restored pixel is complete. The restored pixel can then be displayed including the original truncated and shifted portion and the determined restoration offset. In one embodiment, the number of bits by which the truncated portion is shifted, and hence the number of bits used for the restoration offset, is the same as the number of bits which were removed from the pixel during truncation.

It should be noted that another technique for implementing the invention which yields the same results is to simply compute a restoration offset value by starting with an initial value (such as zero) and incrementing the restoration offset value for each neighbor greater than the pixel to be displayed, and decrementing the restoration offset value for each neighbor that is less than the pixel to be displayed. The restoration offset value is then appended to the truncated portion of the pixel prior to display. Note, however, that this may result in the situation where the restoration value underflows or overflows must be handled, whereas this condition is automatically handled in the embodiment where the truncated portion is shifted and the truncated portion itself is incremented/decremented based on the comparison results.

One advantage of the invention is that it allows image data to be stored in a truncated format while minimizing the visible side effects of truncation and dithering.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 is a block diagram illustrating a simplified graphics system which forms an example environment of the invention.

FIG. 2 is a diagram illustrating a neighborhood of pixels having a central pixel and eight neighbor pixels.

FIG. 3 is a diagram illustrating a restored pixel having a truncated portion and a restored portion.

DETAILED DESCRIPTION

Overview and Discussion of the Invention

Figure 4:
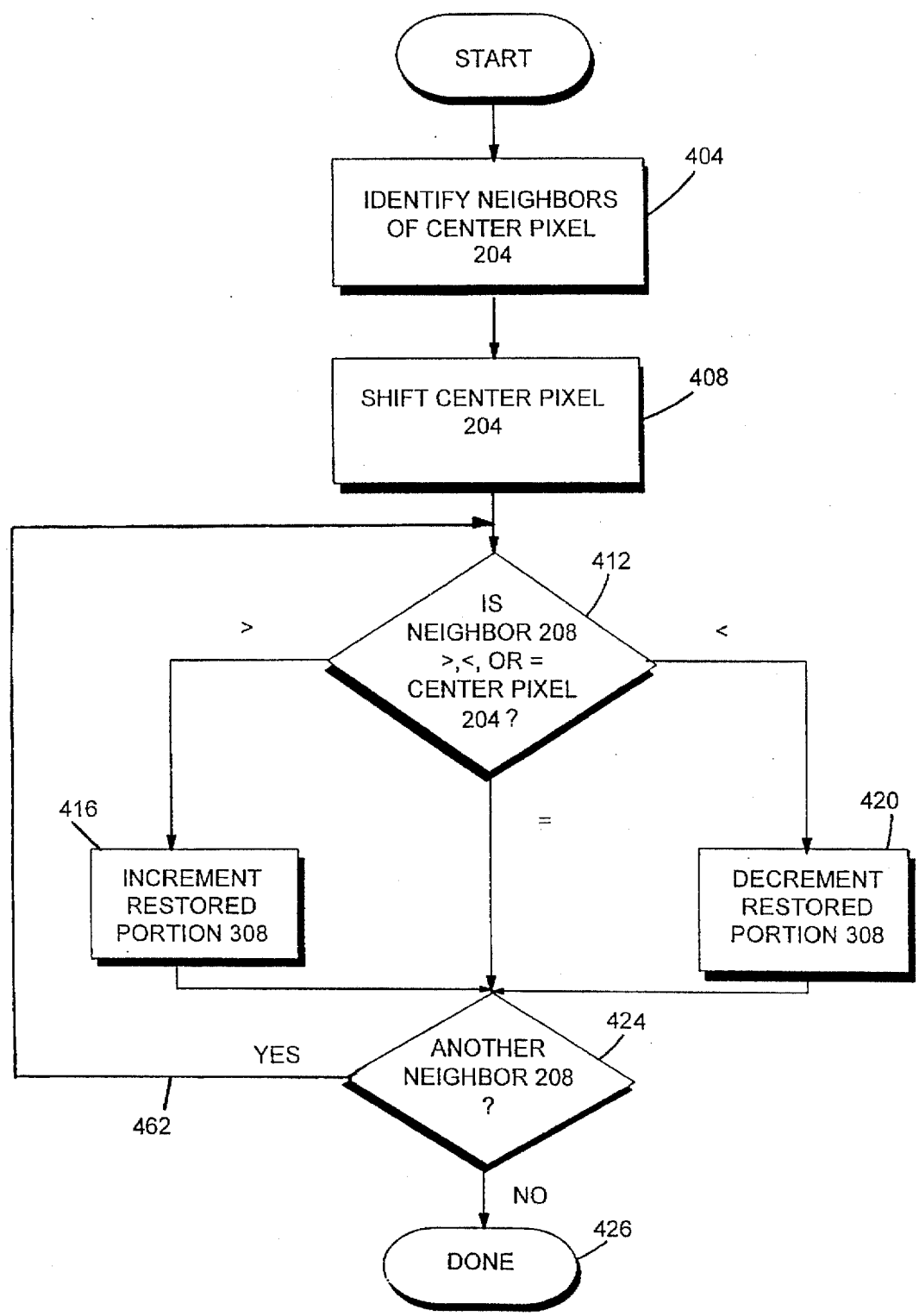
FIG. 4 is an operational flow diagram illustrating the operation of the restoration filter according to one embodiment of the invention.

The present invention is directed toward a system and method for back-filtering to remove the unwanted side effects of dithering in a computer graphics system. According to the invention, after a pixel has been dithered and truncated, but before it is displayed, it is back filtered. The back filtering is a process of comparing each pixel to its surrounding neighbors and determining a restoration offset for the pixel based on the results of the comparison process.

Specifically, according to one embodiment, each truncated pixel is shifted left by the number of bits to be restored. This has the effect of appending a series of zeroes to the pixel. This series of appended bits is referred to as the restoration offset of the pixel. The resultant pixel, including the truncated portion and the restoration offset is referred to as the truncated shifted pixel, or the restored pixel.

For each neighbor having a greater value than the pixel in question, the truncated shifted pixel is incremented by one. Similarly, for each neighbor having a value less than the pixel in question, the truncated shifted pixel is decremented by one. The net result of this increment/decrement operation is that a restored value of the restored pixel is computed and the restored pixel can be displayed.

Example Environment

Before describing the invention in detail, it is useful to provide a simplified description of an example graphics system. FIG. 1 is a block diagram illustrating a basic graphics system 100. The basic graphics system 100 includes a graphics processor 104, a frame buffer 108, a video interface 112 and a display device 116. According to this basic graphics system 100, graphics processor 104 renders the image to be displayed by generating each pixel of the image. Each pixel is comprised of a plurality of bits representing attributes of that pixel such as color or grey scale, transparency, opacity, reflectivity, etc. The pixels generated by graphics processor 104 are stored in frame buffer 108 as they are generated. When the entire frame is generated, the image is transferred from frame buffer 108 to display device 116 via video interface 112. Video interface 112 provides synchronization and timing signals needed to display the image on display device 116.

The present invention is described in terms of this example environment. Description in these terms is provided for convenience only. It is not intended that the invention be limited to application in this example environment. In fact, after reading the following description, it will become apparent to a person skilled in the relevant art how to implement the invention with other graphics systems having different architectures and levels of complexity. Examples of other, more complex graphics systems can be found in numerous references, including U.S. Pat. No. 4,951,232, to Hannah and U.S. Pat. No. 5,038,297 to Hannah, both of which are assigned to Silicon Graphics, Inc., and both of which are incorporated herein by reference. Additionally, the application of the invention is not limited to the computer graphics environments. Other environments that will benefit from the invention include other graphics systems where images are stored and displayed in the form of pixels such as video systems.

Dithering

To maintain an acceptable level of realism in the graphics system 100, it is important that images be rendered fast enough to accommodate the video system's desired frame rate. In order to accomplish this, high speed memory is used to implement frame buffer 108. However, such high speed memory is quite expensive. Therefore, one way to reduce the cost of graphics system 100 is to reduce the size of frame buffer 108. Given a fixed number of pixels, the size of frame buffer 108 can be reduced by reducing the number of bits used to represent each pixel.

As an example, consider a display that is 1024 pixels high by 1280 pixels wide. The total number of pixels needed to render an image on this display is approximately 1.3 million. Given a system having a resolution of eight bits per pixel, the total number of bits required is on the order of 10.4 million. If the number of bits per pixel can be reduced to a lesser number, such as five for example, the total number of bits required would be on the order of 6.5 million, realizing a net savings of about four megabits.

Often, such reduction in bits per pixel is accomplished by simple truncation. That is, one way to reduce the size of frame buffer 116 is to truncate each pixel by removing one or more of the least significant bits of each pixel. Such truncation, however, results in unwanted image artifacts that are unacceptable to the viewer.

To remove unwanted artifacts resulting from pixel truncation, a technique known as dithering is employed. Dithering adds a dither noise to the calculated intensity of the pixels. The amount of dither added to each pixel can be determined with a random process, a pseudo random process or with a calculation based on the coordinate position of the pixel. Adding a dither value to the pixel tends to break up the contours of objects and the overall appearance of the rendered scene is improved.

As an example of a dithering approach, sometimes called ordered dithering, where the calculation is based on the coordinate position of the pixel, consider a case where 2-by-2 pixel grids are used. In this case, a dither matrix is defined with integers zero through three assigned to matrix positions. An example dither matrix for this case may be:

$$D = \begin{matrix} 0 & 3 \\ 1 & 2 \end{matrix}$$

Any of a number of commonly known dither matrices can be employed for the dithering operation. One such matrix is the well known Bayer ordered dither matrix. In the example where 8 bits are being truncated to five, three bits of dither need to be added before truncation. In this case, a four-by-four dither matrix is used with the four-bit values truncated to three bits (by shifting down and dropping the least significant bit). The truncated Bayer matrix is as follows:

$$D = \begin{matrix} 0 & 4 & 1 & 5 \\ 6 & 2 & 7 & 3 \\ 1 & 5 & 0 & 4 \\ 7 & 3 & 6 & 2 \end{matrix}$$

Especially well suited to the restoration filter of the invention is an improved magic square ordered dither matrix. This matrix is as follows:

```
0 6 1 7
4 2 5 3
3 5 2 4
7 1 6 0
```

Note that in the magic square matrix, all rows and columns add to the same value.

In most cases, the dithering is done in two parts. First, a dither pattern is generated and added to the full complement of bits before truncation. This can be done in the end of the rendering pipeline at the time of rendering just before the image is stored in frame buffer 108. In conventional systems, the stored image is processed and displayed using the truncated format.

Restoration Filter

The restoration filter according to the invention is used to replace the bits of the original image that were removed during truncation. This operation is performed at the time that the image is displayed and, preferably performed by video interface 112. The restoration filter is used to replace the truncated bits for each pixel by comparing the pixel to the immediately adjacent pixels. This section of the patent document describes the restoration filter in terms of an example graphics system having an original complement of eight bits per pixel which has been truncated to five bits per pixel and which is to be restored to the full complement of eight bits per pixel prior to display. After reading this description, it will become apparent to a person skilled in the relevant art how to implement the restoration filter with graphics systems having other bit complements and other levels of truncation.

Note that in the example chosen to illustrate the invention, the number of bits in the restoration offset are three, and there are eight neighbors. In this example, the value used to increment or decrement the restoration offset is one. Regardless of the number of bits per pixel and the number of bits truncated, shifted and restored, alternative embodiments can be implemented. For example, alternative embodiments can be implemented wherein the neighborhood size is larger or smaller. Additional alternatives include embodiments where the increment and/or decrement value is some amount other than one. Still other alternatives encompass a combination of these two variations (i.e., different neighborhood size and a different increment and/or decrement values). Such variations will become obvious to one of ordinary skill in the art after reading the above disclosure.

FIG. 2 illustrates a three-by-three block of pixels 200. Center pixel 204, the pixel being restored, is compared to each of its neighboring pixels 208. FIG. 3 illustrates the restored complement of eight bits for a sample pixel having two portions. The first portion is truncated portion 304 which in the example description is a five bit portion. The second portion is the restoration offset portion 308. For purposes of discussion, the least significant bit (LSB) of truncated portion 304 is referred to as LSB 312 and the least significant bit of restoration offset portion 308 is referred to as sub-LSB 316.

The restoration according to the invention is based on the assumption that the neighbor pixels 208 were of the same or similar eight-bit-per-component color of the center pixel 204. If this is not the case, the truncation error is probably not noticeable due to the higher contrast real gradient.

Following this assumption, the restoration filter simply compares each of the eight neighbor pixels 208 with center pixel 204. The manner in which this is accomplished is described with reference to the operational flow diagram illustrated in FIG. 4. Referring now to FIGS. 2, 3 and 4, the first step is to identify the eight neighboring pixels 208 of the pixel in question (i.e., identify the neighbors of center pixel 204). This is illustrated by box 404 in FIG. 4. Note that where the pixel in question is a corner pixel or a border pixel, it may not have a full complement of eight neighbors 208.

The next operation performed by the restoration filter is to shift center pixel 204 up three bits, inserting all zeroes to the three least significant bits. In other words, in this step, the five bit truncated portion 304 of center pixel 204 is augmented by adding an all zero restored portion 308. This shifting step is illustrated by operation box 408 in FIG. 4. This results in a truncated shifted pixel.

The operation continues by comparing center pixel 204 with a neighboring pixel 208 to determine whether the neighboring pixel's five-bit truncated value is greater than or less than the value of truncated portion 304 of center pixel 204. This step of comparing to determine the relative value of center pixel 204 with neighboring pixel 208 is illustrated by decision box 412.

Where the value of truncated portion 304 for the compared neighboring pixel 208 is greater than the value of truncated portion 304 of center pixel 204, the truncated shifted center pixel 204 is incremented by one. This is illustrated by operation box 416.

On the other hand, where the value of truncated portion 304 of neighboring pixel 208 is less than the value of truncated portion 304 of center pixel 204, the truncated shifted center pixel 204 is decremented by one. This operation is illustrated by operation box 420.

In a preferred embodiment, the steps of comparing and incrementing or decrementing are repeated for each neighboring pixel 208 as illustrated by decision box 426 and flow line 462. When all the neighboring pixels 208 have been compared and restored portion 308 updated, the operation is complete as illustrated by done block 424. Note that it is possible to do the comparison, increment and decrement operations for each neighbor in parallel.

The restoration filter according to the present invention effectively reconstructs the missing bits which were removed during truncation prior to storage into frame buffer 108. The maximum error introduced by the restoration is limited to the restored portion 308. In the case of the eight bit example described above, the maximum error is three bits, or eight levels out of 256. This results in a slight error in steep gradients, which is acceptable.

In the embodiments of the restoration filter as described above, the center pixel 204 is compared to the neighbors and its restored portion 308 incremented or decremented based on the results of the comparison. Alternative embodiments are contemplated wherein other algorithms are used to reconstruct restored portion 308.

While the restoration filter described above works for any ordered dither pattern, pseudo-random dither pattern and for systems where no dithering is used, it works best where dithering is performed using a matrix that is carefully chosen to match the reconstruction filter. Results achieved using the standard Bayer matrix during the dithering process are passable but result in a visible high-frequency pattern after the restoration filter is applied. The 'magic square' matrix, described above, spreads the error energy more effectively into lower-amplitude, lower-frequency patterns that are frequently less visually objectionable, although which looks better is, to some extent, a function of the image content.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. In a computer graphics system having a graphics processor for computing a pixel to be displayed and a frame buffer for storing a truncated portion of the pixel to be displayed, a method for restoring the pixel to be displayed prior to display, the method comprising the steps of:

shifting the truncated portion of the pixel to be displayed to the left by one or more bits thereby creating a truncated shifted pixel;

comparing the truncated portion of the pixel to be displayed to a neighboring pixel of the pixel to be displayed;

incrementing said truncated shifted pixel where a value of said neighboring pixel is greater than a value of the pixel to be displayed; and decrementing said truncated shifted pixel where a value of said neighboring pixel is less than a value of the pixel to be displayed.

2. The method according to claim 1, wherein said steps of comparing, incrementing and decrementing are performed for each neighboring pixel of said pixel to be displayed.

3. In a computer graphics system having a graphics processor and a frame buffer for storing a truncated portion of a pixel to be displayed, a method for restoring the pixel to its full complement of bits prior to display, the method comprising the steps of:

comparing the truncated portion of the pixel to be displayed to a neighboring pixel;

determining a value of a restored offset portion of the pixel to be displayed based on results of said step of comparing; and appending said restored offset portion to said truncated portion of the pixel to be displayed to restore the pixel to be displayed.

4. The method of claim 3, further comprising the step of repeating said steps of comparing and determining for each pixel neighboring the pixel to be restored.

5. The method of claim 4, wherein said step of determining a value of a restored offset portion of the pixel to be displayed comprises the steps of:

incrementing said restored offset portion of the pixel to be displayed for each compared neighboring pixel that has a value greater than the pixel to be displayed; and decrementing said restored offset portion of the pixel to be displayed for each compared neighboring pixel that has a value less than the pixel to be displayed.

6. In a computer graphics system having a processor for generating pixels to be displayed and having a frame buffer for storing the pixels generated by the processor, a method for reducing a number of bits required to be stored in the frame buffer to represent a pixel while maintaining image quality, the method comprising the steps of:

truncating the bits representing the pixel to be displayed to remove a subset of the bits and leave a truncated portion of the pixel to be displayed;

storing said truncated portion of the pixel to be displayed in the frame buffer;

comparing said truncated portion of the pixel to be displayed to at least one neighboring pixel; and modifying the pixel to be displayed based on said comparison to restore the pixel prior to display.

7. The method of claim 6, wherein said modifying step comprises the steps of:

shifting said truncated portion of the pixel to be displayed to the left by one or more bits prior to said comparing step thereby creating a truncated Shifted pixel;

incrementing said truncated Shifted pixel where said neighboring pixel is greater than said truncated portion of the pixel to be displayed; and decrementing said truncated shifted pixel where said neighboring pixel is less than said truncated portion of the pixel to be displayed.

8. The method of claim 7, further comprising the step of repeating said steps of truncating, storing, shifting, comparing, incrementing and decrementing for each pixel to be displayed.

9. The method according to claim 7, wherein said steps of comparing, incrementing and decrementing for a pixel to be restored are performed for each pixel that is a neighboring pixel of said pixel to be displayed.

10. The method of claim 7, further comprising the step of dithering the bits representing a pixel prior to truncation.

11. The method according to claim 6, wherein said modifying step comprises the steps of:

determining a value of a restored offset portion based on results of said step of comparing; and appending said restored offset portion to said truncated portion of the pixel to be displayed prior to display.

12. The method of claim 11, further comprising the step of repeating said steps of truncating, storing, comparing, determining and appending for each pixel to be displayed.

13. In a system for displaying an image using pixels the system having a memory for storing the pixels, a method for reducing a number of bits required to be stored in memory for each pixel while maintaining image quality, the method comprising the steps of:

truncating the bits for at least one of the pixels to be displayed to remove a subset of the bits and leave a truncated portion for each truncated pixel;

storing said truncated portion of each truncated pixel in the memory;

comparing said truncated portion of each truncated pixel to at least one neighboring pixel; and modifying said truncated pixels based on said comparing step to restore said truncated pixels prior to display.

14. The method of claim 13, wherein said modifying step comprises:

shifting said truncated portion to the left by one or more bits prior to said comparing step thereby creating a truncated Shifted pixel;

incrementing said truncated shifted pixel where said neighboring pixel is greater than the truncated portion of the pixel to be displayed; and decrementing said truncated shifted pixel where said neighboring pixel is less than the truncated portion of the pixel to be displayed.

15. The method of claim 14, further comprising the step of repeating said steps of shifting, comparing, incrementing and decrementing for each pixel to be restored.

16. The method according to claim 14, wherein said steps of comparing, incrementing and decrementing for a pixel to be restored are performed for each neighboring pixel.

17. The method according to claim 13, wherein said modifying step comprises the steps of:

determining a value of a restored offset portion of said truncated pixel based on results of said step of comparing; and appending said restored offset portion to said truncated portion to restore the pixel to be displayed.

18. The method according to claim 17, further comprising the step of repeating said steps of comparing, determining and appending for each pixel to be restored.

19. The method of claim 13, further comprising the step of dithering the bits of the pixel prior to truncation.

20. A computer program product for use with a computer system, said computer program product comprising:

a computer usable medium having computer readable program code means embodied in said medium for causing the computer system to generate pixels to be displayed, to store the pixels generated by the processor in memory, and to reduce the number of bits required to be stored in the memory to represent each pixel while maintaining image quality, said computer readable program code means comprising computer readable program code means for truncating the bits representing said pixel to be displayed to remove a subset of the bits and leave a truncated portion for said pixel, computer readable program code means for storing, in memory, said truncated portion of the pixel to be displayed, computer readable program code means for comparing said truncated portion to a neighboring pixel, and computer readable program code means for modifying said pixel to be displayed based on said comparison to restore said pixel to be displayed prior to display.

21. The computer program product according to claim 20, wherein said computer readable program code means for modifying said pixel to be displayed comprises:

computer readable program code means for shifting said truncated portion of the pixel to be displayed to the left by one or more bits prior to said comparison to create a truncated shifted pixel;

computer readable program code means for incrementing said truncated shifted pixel where said neighboring pixel is greater than said truncated portion; and computer readable program code means for decrementing said truncated shifted pixel where said neighboring pixel is less than said truncated portion.

22. The computer program product according to claim 21, further comprising:

computer readable program code means for repeating said means for truncating, storing, shifting, comparing, incrementing and decrementing for each pixel to be displayed; and computer readable program code means for comparing, incrementing and decrementing each pixel to be restored for each neighboring pixel.

23. The computer program product according to claim 20, wherein said computer readable program code means for modifying said pixel to be displayed comprises:

computer readable program code means for determining a value of a restored offset portion of said pixel to be displayed based on results of said comparison; and computer readable program code means for appending said restored offset portion to said truncated portion prior to display.

24. The computer program product according to claim 23, further comprising:

computer readable program code means for causing said computer system to repeat said truncating, storing, comparing, determining and appending for each pixel to be displayed.

* * * * *